April 17, 1956 H. M. SCHWEIGHOFER 2,742,599
SHAFT POSITIONING DEVICE
Filed Feb. 11, 1952 2 Sheets-Sheet 1
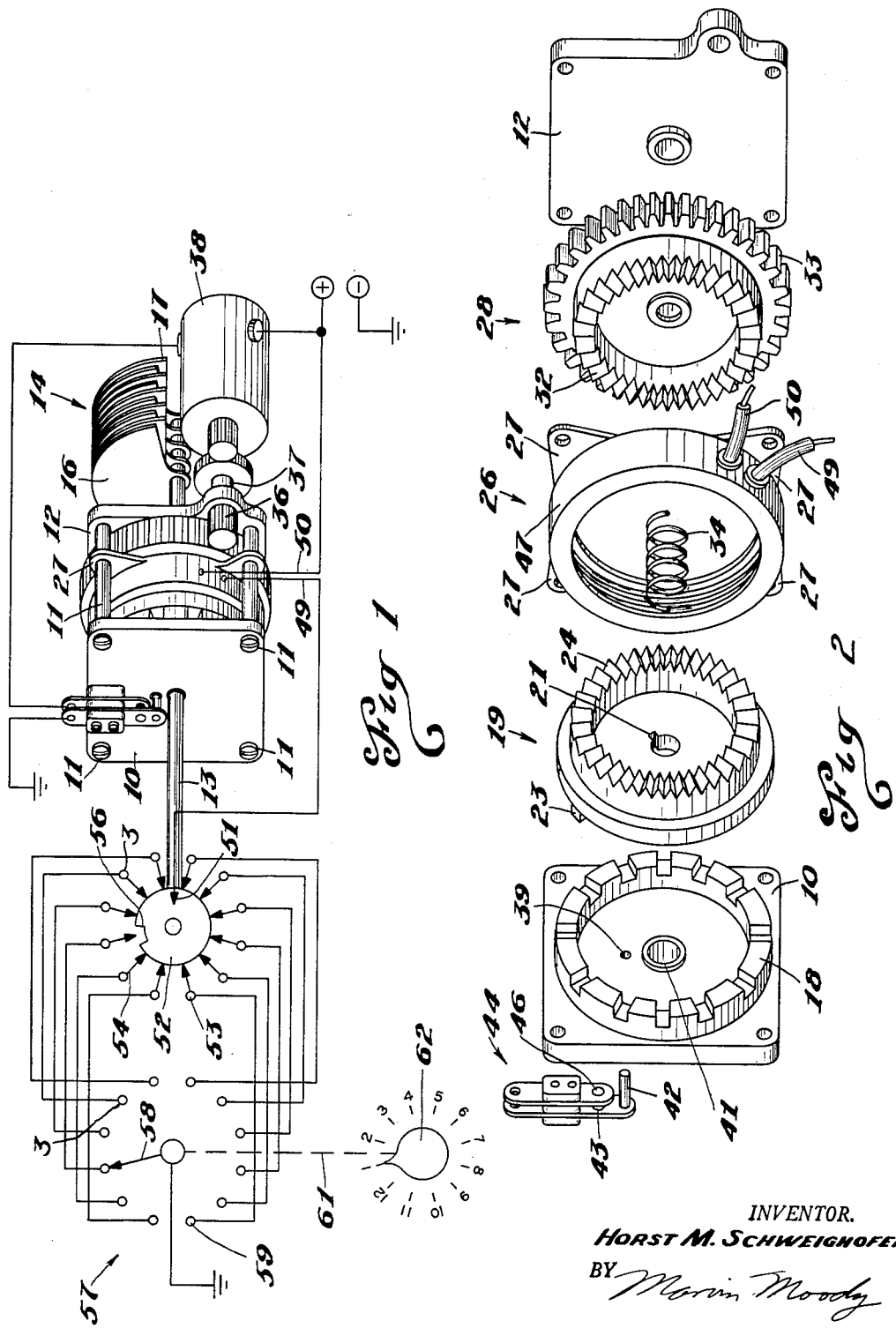
INVENTOR.
HORST M. SCHWEIGHOFER
BY Marvin Moody
ATTORNEY April 17, 1956   H. M. SCHWEIGHOFER   2,742,599
SHAFT POSITIONING DEVICE
Filed Feb. 11, 1952   2 Sheets-Sheet 2

INVENTOR.
HORST M. SCHWEIGHOFER
BY
ATTORNEY

United States Patent Office 2,742,599
Patented Apr. 17, 1956

2,742,599

SHAFT POSITIONING DEVICE

Horst M. Schweighofer, Cedar Rapids, Iowa, assignor to Collins Radio Company, Cedar Rapids, Iowa, a corporation of Iowa Application February 11, 1952, Serial No. 271,020

2 Claims. (Cl. 318—467)

This invention relates in general to shaft positioning mechanisms and in particular to apparatus wherein a relay controls a clutch to lock and unlock respectively, a toothed-stop wheel.

Many times, in the engineering field, it is desirable to control a shaft so that it will repeatedly stop at any one of a number of preset positions.

The Patent 2,476,673, entitled "Shaft Positioning Control System," which issued on the 19th day of July, 1949, discloses a system for accomplishing this. The present invention is another way for accomplishing this result.

It is an object of this invention, therefore to provide a shaft positioning means which will remember a plurality of preset positions.

A further object of this invention is to provide a shaft positioning mechanism which is positive in operation and has great accuracy.

Further features, objects and advantages of this invention will become apparent from the following description and claims when read in view of the drawings, in which:

Figure 1 illustrates the shaft control mechanism of this apparatus with its related control circuit;

Figure 2 is an exploded view of the shaft positioning mechanism of this invention;

Figure 3:
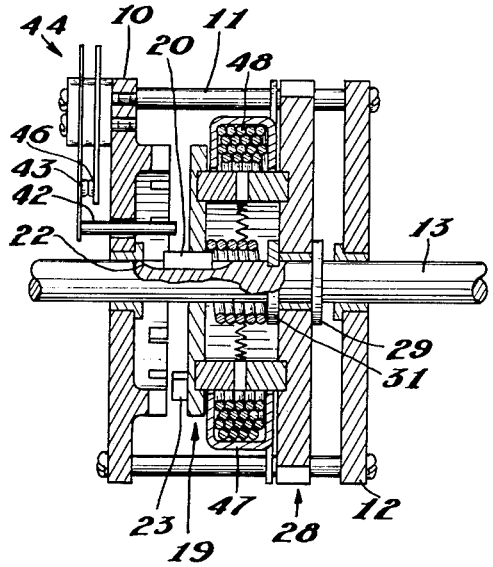
Figure 3 is a sectional view of the shaft positioning mechanism illustrating it in the engaged position; and, Figure 4 is a half-section view illustrating the clutch in the disengaged position.

Figure 1 illustrates a plate 10 which has a standoff 11 mounted at each corner thereof that are attached to a second plate 12. A shaft 13 extends through the plates 10 and 12 and is rotatably supported therein. One end of the shaft 13 is connected to a controlled element designated generally as 14, which might for example, comprise a condenser which has its rotor plates 16 connected to the shaft 13. The stator plates may be suitably supported adjacent the rotor plates.

As best shown in Figure 2, mounted to the inner face of plate 10 is a toothed-stop wheel 18 which has gaps formed in its extending portion. An annular armature clutch member 19 is slidable but non-rotatably supported on the shaft 14, as for example, by inserting a key 20 into key-ways 21 and 22.

A pair of projections 23 extend longitudinally from the member 19 and are of a size such that they may be received in the teeth of the stop wheel 18. The opposite side of the member 19 has a clutch face 24 which might be serrated or covered with a suitable friction material.

An annular coil designated generally as 26, is mounted between the plates 10 and 12 and is attached to the standoffs 11 by the extending tabs 27. The inner diameter of the coil 26 is such that the clutch portion 24 may move therethrough.

Rotatably supported on the shaft 13 between the member 19 and the plate 12 is a second clutch member 28. This member is rotatably but non-slidably supported on the shaft 13. A pair of washers 29 and 31, best shown in Figure 3, prevent it from moving longitudinally of the shaft. It has a clutch face 32 which may be serrated or have a friction material attached thereto and is engageable with the portion 24 of the first clutch member 19. Teeth are formed about the circumference of the member 28 for a purpose to be later described. A spring 34 is mounted about the shaft 13 and biases the members 19 and 28 apart.

A driving gear 36 is mounted on a shaft 37 which is rotatably supported by the plate 12 and is geared or directly coupled to a suitable driving means, as for example, an electric motor 38.

The plate 10 has an opening 39 formed therethrough adjacent the opening 41 through which the shaft 13 passes and a pin 42 extends therethrough. One end of the pin 42 is engageable with the surface of the member 19 and the other end is engageable with a switch contact 43 which forms a part of a switch designated generally as 44.

The switch 44 is attached to the plate 10 and has, as best shown in Figure 3, a second contact 46 that is engageable with contact 43. As shown in Figure 1, contact 43 is electrically connected to ground and contact 46 is connected to one terminal of the motor 38. The other terminal of the motor 38 is connected to one side of a suitable voltage source, as for example, 28 volts D. C. The other side of the voltage source may be connected to ground. When the switch 44 is closed, the motor will run thus driving the second clutch wheel 28.

Figure 4:
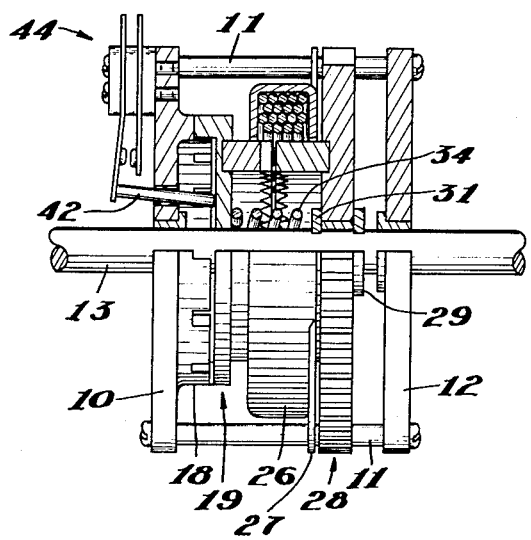

The annular coil 26 comprises a U-shaped cover member 47 which is best shown in the sectional views of Figures 3 and 4, and a plurality of turns of wire 48 mounted therein. The clutch members 19 and 28 are made of a suitable magnetic material so that when current passes through the coils 48 they will be attracted together against the tension of the spring so that the clutch will be engaged. Since the member 19 is slideably, but non-rotatably supported on the shaft 13, whereas the shaft 13 is rotatably connected to the member 28, the motor 38 will drive the shaft 13 when the coil is energized. When the coil is de-energized the clutch faces 24 and 32 will be disengaged and the projections 23 will drop in a slot in the stop wheel 18, thus locking the controlled shaft 13.

Thus, by controlling the current supplied to the leads 49 and 50 of the coil 48, the position of shaft 13 may be controlled. The lead 50 is connected to the positive side of the voltage source which supplies the motor 38. Lead 49 is connected to a contact 51 engageable with a conducting disc 52 of a wafer switch. A plurality of contacts 53 are mounted about the disc 52 with a number of short wiper contacts 54 connected to each. A gap 56 is formed in the disc 52 and is of a size such that it extends approximately the distance between adjacent contacts 54.

A remote control switch designated generally as 57 has a wiper contact 58 that is engageable with a plurality of terminals 59 mounted about its periphery. The terminals 59 are connected respectively to the terminals 53. The wiper contact 58 is grounded and is mechanically connected by shaft 61 to a control knob 62. It is to be realized, of course, that the knob 62 and the control switch 57 may be located at any remote position.

The switches thus shown may be used to position the shaft 13 to any number of positions equal to the number of terminals 59. Thus, for example as shown in Figure 1, twelve positions of the shaft 13 may be obtained. This number corresponds to the number of teeth in the stop-wheel 18.

It is to be realized, of course, that there are a number of different circuits that may be used for actuating this mechanism and reference may be made to Patent Number 2,476,673 for other circuits.

In operation let it be assumed that it is desired to move the controlled element comprising the rotor plates 16 of the condenser to a new position. The knob 62 is turned, as for example, to position 3. This mechanically moves the wiper contact 58 to terminal 3 on switch 57 which closes the circuit to the relay coil 48. This may be seen by tracing the coil circuit from ground through the wiper contact 58, the terminal 3 of switch 57 to the terminal 3 of disc 52, the contact 51 to the coil 48 and to the positive side of the voltage source. Thus, the coil will be energized and the clutch plate 19 will be moved longitudinally of the shaft 13 moving the projections 23 out of engagement with the teeth of the stop wheel 18. The pin 42 will then move to the right with reference to Figure 2. This closes the contacts to switch 44. This causes the motor 38 to start thereby driving shaft 13 and disc 52 until the gap 56 is adjacent the contact 54 connected to terminal 3. When this occurs, the circuit to the coil 48 will be opened and the spring 34 will force the clutch plates apart so that the projections 23 fall into a groove in the stop wheel 18. This opens the switch 44 and disconnects the motor.

It is seen that this invention comprises a new and novel means of controlling the position of a shaft to any one of a plurality of positions.

Although this invention has been described with respect to particular embodiments thereof, it is not to be so limited as changes and modifications may be made therein which are within the full intended scope of the invention as defined by the appended claims.

I claim:

1. Shaft positioning apparatus comprising, a control shaft, a pair of plates rotatably supporting said control shaft, a toothed stop-wheel attached to one of said plates, an annular armature clutch member slidably but non-rotatably supported on said control shaft, a projection extending from said armature clutch member and engageable with the teeth of said stop-wheel, a second clutch member rotatably supported on said control shaft, an annular coil supported by one of the plates between the first and second clutch members, a driving means connected to the second clutch member, a seeking switch connected electrically to the annular coil, a motor control switch connected to the first plate, a pin connected to said motor control switch and engageable with the first clutch member, the motor control switch electrically connected to said motor, a remote control switch electrically connected to said seeking switch, and a control knob connected to said control switch to vary its position.

2. Shaft controlling apparatus comprising, a controlled shaft rotatably supported between a pair of plates, an annular coil mounted between said plates with the controlled shaft passing therethrough, a pair of magnetic clutch members mounted to said controlled shaft and engageable within the confines of a said annular coil, a first of said clutch members slidably but non-rotatably supported on said controlled shaft, the second clutch member rotatably but non-slidably mounted on said controlled shaft, a toothed stop-wheel mounted on one of said plates adjacent the first clutch member, projections formed on said first clutch member and engageable with the teeth of said stop-wheel, spring biasing means pushing said first and second clutch members apart, a driving means connected to the second clutch member, a motor control switch mounted on one of said plates, an actuating pin extending through one of said plates between the motor control switch and the first clutch member, said motor control switch electrically connected to said driving means, the other side of said driving means connected to a voltage source, one side of said annular coil connected to said voltage source, a seeking switch mounted on the controlled shaft and connected electrically to the annular coil, a control switch electrically connected to said seeking switch, and a control knob connected to said control switch for varying its angular position.

References Cited in the file of this patent

UNITED STATES PATENTS

| | | |
|---|---|---|
| 665,318 | Garrett | Jan. 1, 1901 |
| 936,284 | Abernethy | Oct. 12, 1909 |
| 2,019,638 | Stoller et al. | Nov. 5, 1935 |
| 2,180,412 | Hart | Nov. 21, 1939 |
| 2,476,016 | Yardeny | July 12, 1949 |
| 2,490,044 | Garbarini et al. | Dec. 6, 1949 |
| 2,496,485 | McNaney | Feb. 7, 1950 |
| 2,519,695 | Olsson et al. | Aug. 22, 1950 |
| 2,526,628 | Belock | Oct. 24, 1950 |